No. 802,242. PATENTED OCT. 17, 1905.
C. MANNEL, DEC'D.
E. STEWART, ADMINISTRATRIX.
METALLURGICAL FILTER.
APPLICATION FILED FEB. 14, 1905.
2 SHEETS—SHEET 1.
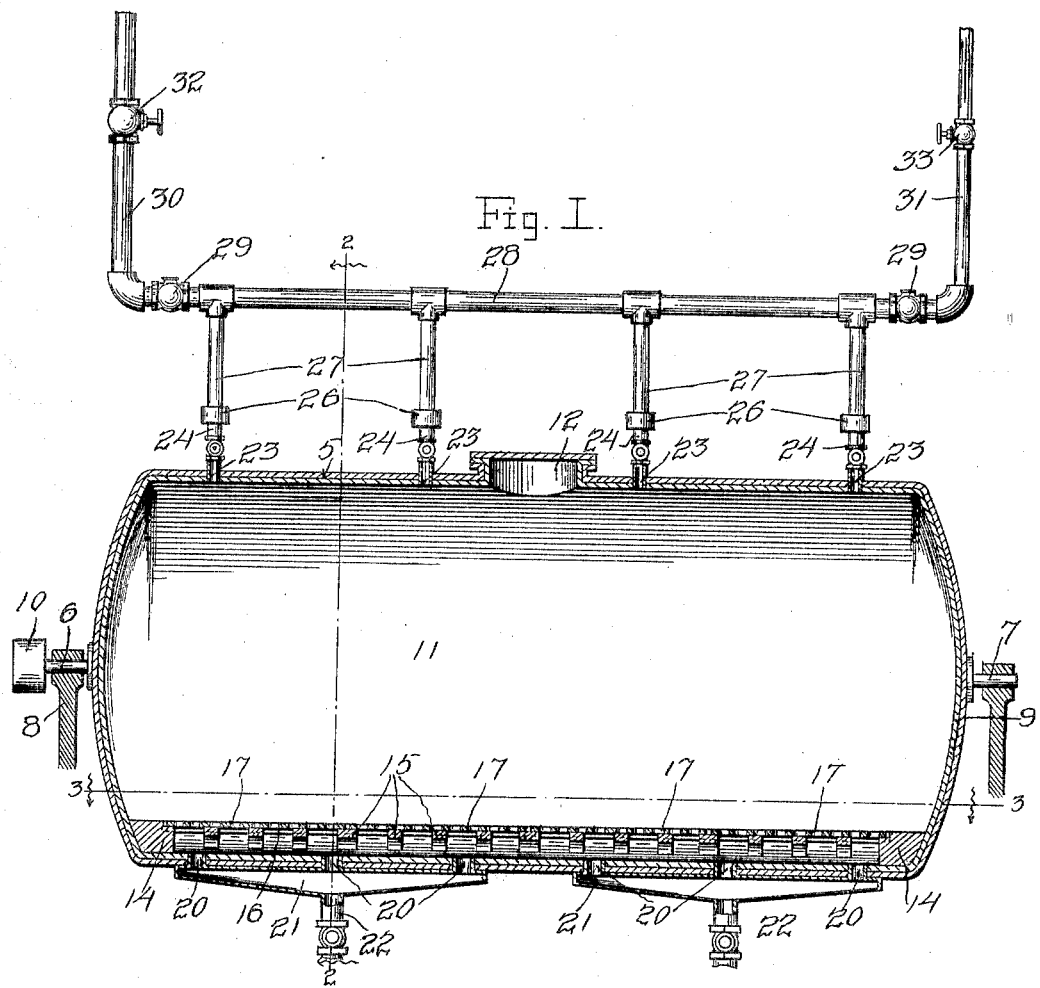

No. 802,242. PATENTED OCT. 17, 1905.
C. MANNEL, DEC'D.
E. STEWART, ADMINISTRATRIX.
METALLURGICAL FILTER.
APPLICATION FILED FEB. 14, 1905.
2 SHEETS—SHEET 2.
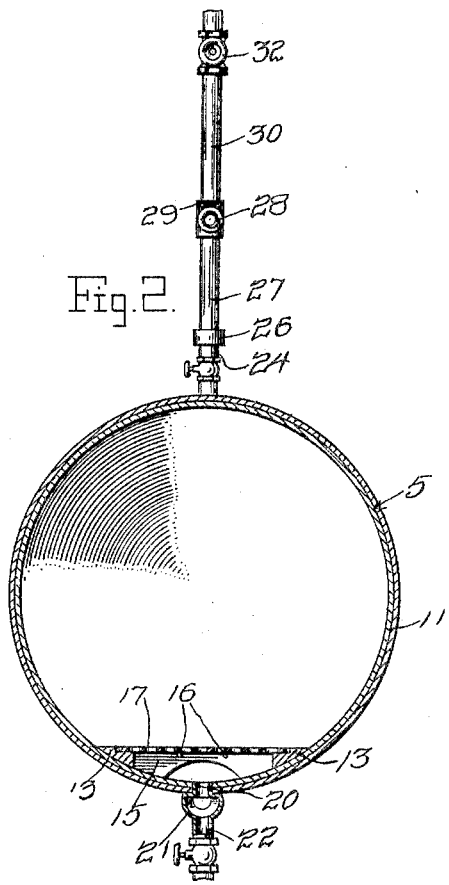
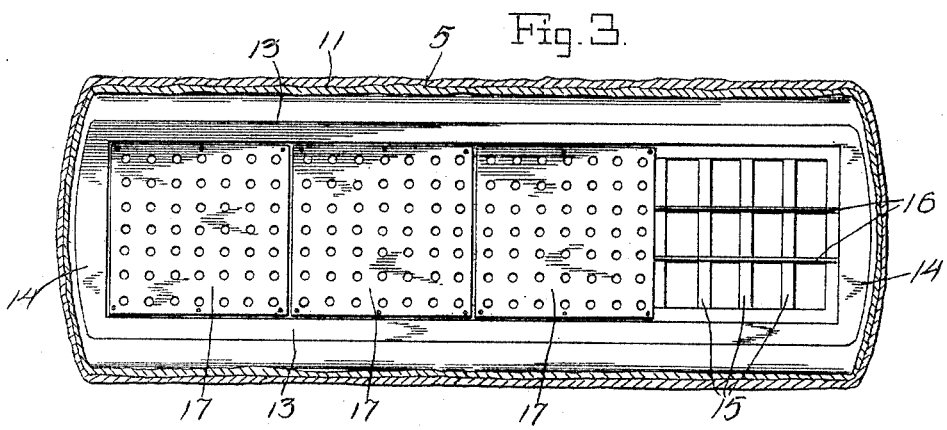

UNITED STATES PATENT OFFICE.

EMMA STEWART, OF COLORADO CITY, COLORADO, ADMINISTRATRIX OF CHARLES MANNEL, DECEASED.

METALLURGICAL FILTER.

No. 802,242.        Specification of Letters Patent.        Patented Oct. 17, 1905.

Application filed February 14, 1905. Serial No. 245,628.

*To all whom it may concern:*

Be it known that I, EMMA STEWART, a citizen of the United States, residing at Colorado City, in the county of El Paso, State of Colorado, administratrix of the estate of CHARLES MANNEL, deceased, late a citizen of Colorado City, El Paso county, Colorado, as by reference to the duly-certified copy of letters of administration hereto annexed will more fully appear, do hereby declare that the said CHARLES MANNEL did invent certain new and useful Improvements in Metallurgical Filters; and I do hereby declare the following to be a full, clear, and exact description of the invention, such as will enable others skilled in the art to which it appertains to make and use the same.

This invention relates to barrel-filters such as are employed in metallurgy, the object of the invention being to provide a filter which will be cheap, strong, and durable, in which the filtering operation may be quickly performed, in which the filtering-plates will not become stopped up, and in which the filter will have the highest efficiency at all stages of its operation.

Other objects and advantages of the invention will be understood from the following description.

In the drawings forming a portion of this specification, and in which like numerals of reference indicate similar parts in the several views, Figure 1 is a vertical section taken longitudinally through a filter embodying the present invention. Fig. 2 is a section on line 2 2 of Fig. 1. Fig. 3 is a section on line 3 3 of Fig. 1, parts of the filter-plate being removed.

Referring now to the drawings, there is shown a filter comprising the usual cylindrical body portion or barrel 5, having trunnions 6 and 7 at its ends, which are mounted in suitable bearings 8 and 9, the trunnion 6 being provided with a belt-pulley 10 for rotating the filter. The barrel 5 has a lining 11 of lead, and in one side of the barrel is the usual manhole 12. Equidistant from a longitudinal line diametrically opposite to the manhole 12 are ledges 13, and between the ledges at their ends and flush with the upper faces thereof are supports 14, which extend continuously from one ledge to the other. Extending from one ledge to the other between the supports 14 are segmental supports 15, the curved edges of which lie close against the lining of the barrel and the abrupt ends of which abut against the ledges, while the upper straight faces of the supports 15 are flush with the upper faces of the ledges and supports 14. Let into the upper faces of the supports 15 are the two rods 16, which are flush with the upper faces of the supports 15, the spacing between the rods being substantially equal to that between each rod and the adjacent ledge. The lower edges of the supports 15 are arched or cut away between the bars 16. The members 13, 14, 15, and 16 serve to support the filter-plates 17, which are disposed thereon and which in the present instance are four in number and are arranged end to end, with their side portions resting upon the ledges 13. The outermost end portions of the end plates 17 rest upon the supports 14, while the remaining end portions of the plates rest upon certain of the supports 15, which are made broader for this purpose. Each of the filter-plates consists of a sheet of an alloy of twelve parts antimony and eighty-eight parts soft lead. In these plates are formed longitudinal lines of perforations drilled, not punched, therein. The longitudinal edges of the filter-plate are offset slightly from the lining of the barrel, and the ends of the endmost plates are likewise spaced from the lining of the barrel or shell. All parts within the lining of the barrel-shell are formed of an alloy of lead and antimony, the antimony contributing stiffness and durability. The plates 17 are secured in the body of the barrel 5 in the usual manner.

Through the barrel-shell and its lining below the filter-plates are formed a series of perforations 20, in the present instance six in number, and in which are disposed short sections of lead pipe, which are burned onto the lining and onto the heads 21, there being two of these heads, each connected in this manner with an end series of three perforations. The heads are shaped transversely to fit the curvature of the barrel-shell, and the depths of these heads, which are hollow, increase gradually from their ends to their central portions, where are connected the decanting-pipes 22.

Diametrically opposite to the perforations 20 and at each side of the manhole 12 are a pair of perforations 23, through which are passed lead pipes or alloy pipes 24, that are burned onto the lining 11 and which project beyond the outer surface of the shell and are provided with couplings 26 of any suitable type for connection with pipes 27, that depend from a main 28, having check-valves 29 at its ends and beyond which are connected water and air supply pipes 30 and 31, respectively, having controlling-valves 32 and 33, respectively.

From the above description it will be understood that there is proposed a filter which is simple in construction, which is durable because of the arrangement of the parts and the manner in which the filter-plates are supported, and which is efficient in its operation.

It will be understood that when the contents of the filter are to be subjected to air or water under pressure the pipes 27 are coupled to the pipes 24 and the manhole 12 is closed, the air or water being admitted to the main 28 by manipulation of the corresponding globe-valve.

The operation of the filter will be fully understood by those skilled in the art.

The outlets 22 and the inlets 24 may be provided with any suitable style of cut-off valves, as illustrated, while the manhole 12 is provided with a removable cover.

In practice modifications of the specific construction shown may be made, and any suitable materials and proportions may be used for the various parts without departing from the spirit of the invention.

What is claimed is—

1. A filter comprising a rotatable shell, longitudinal, spaced ledges within the shell, filter-plates secured upon the ledges, the shell beneath the filter-plates being perforated, and decanting-pipes having heads with which said perforations communicate in series.

2. A filter comprising a shell, longitudinal, spaced ledges in the shell, filter-plates secured upon the ledges, supports for the plates between the ledges, said shell having perforations therethrough beneath the filter-plates, decanting-pipes and a head for each decanting-pipe with which the perforations communicate in groups.

3. A filter comprising a shell, having a non-corrosive lining, ledges extending longitudinally within the shell in spaced relation, filter-plates secured upon the ledges, supports between the ledges at intervals longitudinally of the plates, decanting-pipes having heads, pipes connecting each of said heads with the interior of the filter beneath the filter-plates, pipes leading into the shell at the opposite sides of the filter-plates from the heads, and means for connecting the fluid-supply pipes with the last-named pipes.

In testimony whereof I affix my signature in presence of two witnesses.

EMMA STEWART,
*Administratrix of the estate of Charles Mannel, deceased.*

Witnesses:
U. G. HARVEY,
ALBERT ALLEN.